United States Patent [19]

Chambers

[11] 4,071,938
[45] Feb. 7, 1978

[54] METHOD OF MAKING COMPOSITE SKATE ASSEMBLY

[75] Inventor: Alan F. Chambers, Agincourt, Canada

[73] Assignee: Nylite Skate Company of Canada Ltd., Markham, Canada

[21] Appl. No.: 752,055

[22] Filed: Dec. 20, 1976

Related U.S. Application Data

[60] Continuation-in-part of Ser. No. 677,577, April 16, 1976, abandoned, which is a division of Ser. No. 608,499, Aug. 28, 1975, abandoned.

[51] Int. Cl.² .................................................. B23P 17/00
[52] U.S. Cl. .................................... 29/423; 29/526 R; 29/527.4; 264/237; 264/238; 264/275; 280/11.12; 280/11.17
[58] Field of Search ................ 29/423, 526, 527.4, 29/527.3, 527.2, 527.1; 264/238, 237, DIG. 71, 275; 280/11.12, 11.17

[56] References Cited

U.S. PATENT DOCUMENTS

| 1,405,981 | 2/1922 | Dreuitson | 280/11.17 |
| 1,591,778 | 7/1926 | Radus | 280/11.12 |
| 1,608,963 | 11/1926 | Smilden | 280/11.17 |
| 1,646,843 | 10/1927 | Winslow | 280/11.17 |
| 1,666,690 | 4/1928 | Drevitson | 280/11.17 |
| 1,750,691 | 3/1930 | Schmidt | 280/11.17 |
| 1,771,755 | 7/1930 | Heath | 280/11.17 |
| 2,242,870 | 5/1941 | Prosey | 280/11.18 |
| 3,212,786 | 10/1965 | Florjancic et al. | 280/11.12 |
| 3,545,778 | 12/1970 | Weidenbacker | 280/11.12 |
| 3,558,149 | 1/1971 | Weidenbacker | 280/11.12 |

FOREIGN PATENT DOCUMENTS

| 585,780 | 10/1959 | Canada | 280/11.17 |
| 123,068 | 9/1959 | U.S.S.R. | 280/11.12 |

Primary Examiner—Victor A. Dipalma
Attorney, Agent, or Firm—Rogers, Bereskin & Parr

[57] ABSTRACT

The invention provides ice skates and methods of making ice skates which have a body of a synthetic plastic material and a steel blade. The body includes an upper portion for attachment to the sole of a suitable boot and the blade has an upper portion enclosed in the body and a lower portion projecting from the body. The blade has a non-interfering upper surface which allows the body to move freely longitudinally of the blade during shrinking. This movement prevents build-up of residual stress in the body.

13 Claims, 13 Drawing Figures

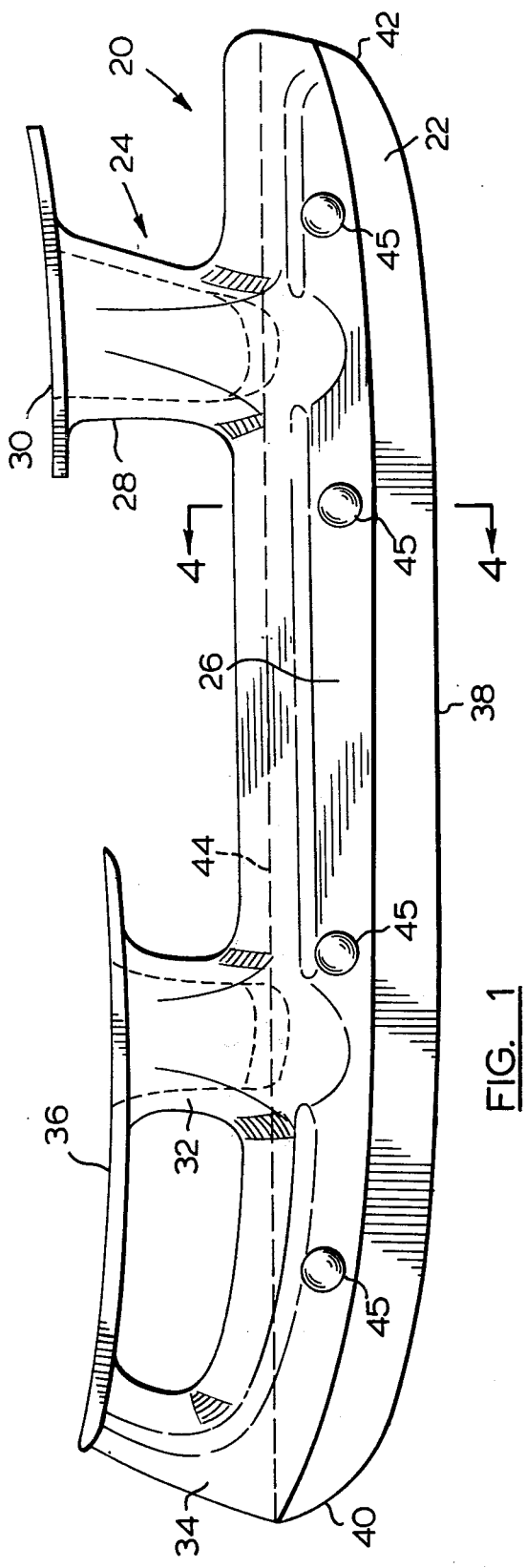
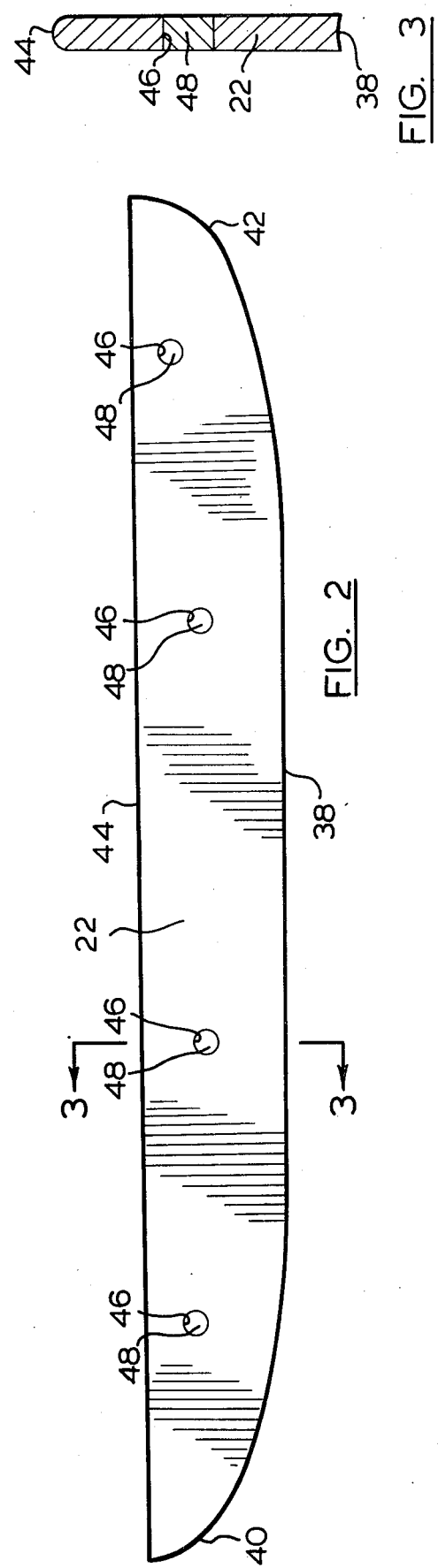

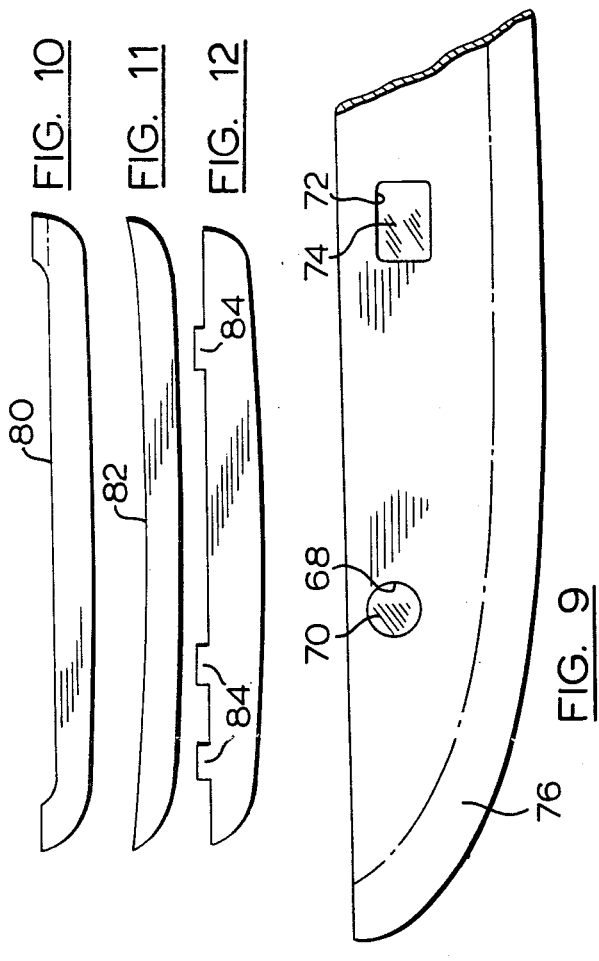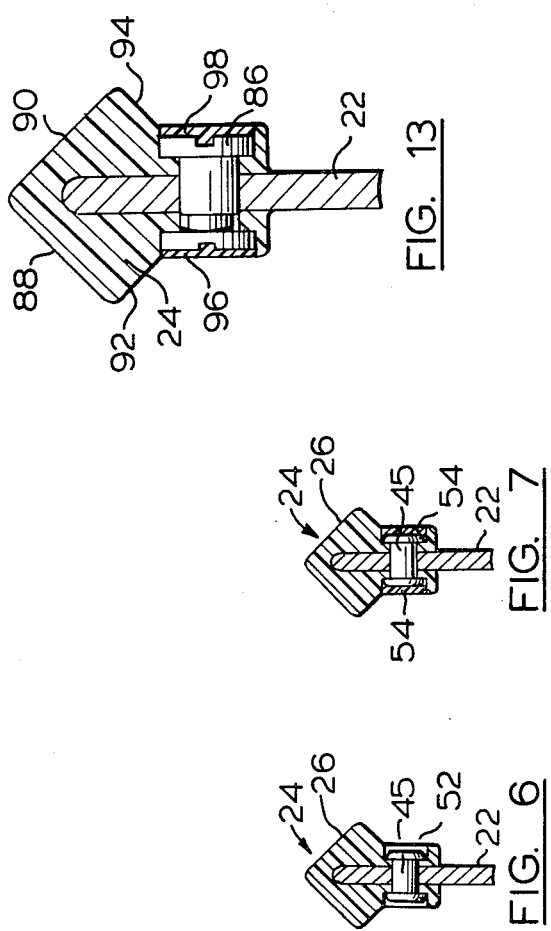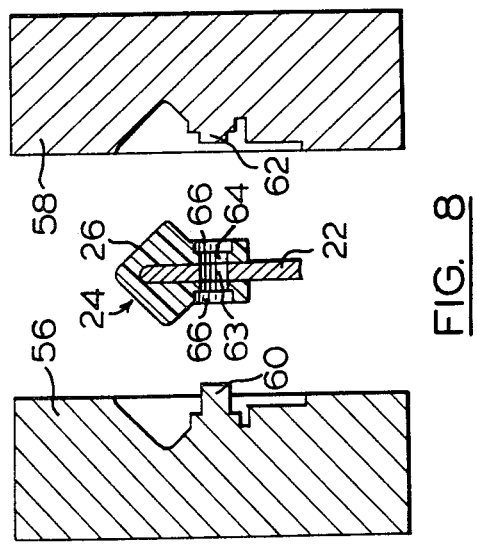

METHOD OF MAKING COMPOSITE SKATE ASSEMBLY

This is a continuation-in-part of application Ser. No. 677,577 filed Apr. 16, 1976 now abandoned which application was a divisional of application Ser. No. 608,499, filed on Aug. 28, 1975 and now abandoned.

This invention relates to ice skates of a type which are adapted to be attached to the soles of suitable boots for use in ice hockey and similar activites.

Designers of ice skates must meet two major criteria. Firstly, the ice skate should be as light as possible so that the energy expended by a skater is kept to a minimum. This facilitates fast starts and the skater will find lighter ice skates to be less tiring to use. Secondly, the designer must ensure that ice skates have sufficient strength to withstand impacts and high side loading caused by a skater stopping or changing direction suddenly.

Traditionally, ice skates are built so as to comprise a hardened steel blade suitably secured to a metal body or frame which includes elevated toe and heel platforms secured to the underside of a boot. Quality skates made today include blades and body or frame made of steel with the blade being secured to a tubular section of the frame by spot welding.

Several difficulties exist with skates utilizing a metal blade-supporting body or frame. First, in fabricating a metal blade-supporting body to a blade it is conventional practice to use eight different steel components which are variously spot welded together. Not only is there a problem in insuring the integrity of such welds, but in welding the blade to the body there is the constant danger of weakening or reducing the temper of the hardened steel blade.

A further problem with traditional designs is that it has become increasingly more difficult to obtain consistently high quality steel for use in such blade-supporting bodies. As lesser quality steel has been used, breakage and rusting of such bodies has become more frequent.

In recent years a number of designs have been proposed which include a body of a synthetic plastic material attached during moulding to a hardened steel blade. Canadian Pat. No. 585,720 illustrates such a structure. The plastic material is moulded about a plurality of keying devices which are spaced along the length of the blade and through holes in the blade to form an integral ice skate. A further example of this type of structure is shown in Russian Pat. No. 123,068. This structure includes a blade which is perforated by a series of holes spaced along its length so that the body is locked to the blade by moulding through these holes. Another example is to be found in U.S. Pat. No. 3,212,786.

An ice skate having a body of synthetic plastic material appears initially to have many advantages. The body is light and can be attached to the blade by moulding the body directly about a suitably shaped portion of the blade. Although the initial cost of the moulds is high, the subsequent manufacturing costs for large quantities would indicate that the process would be economic. However there is also a major drawback in the manufacture of such an ice skate caused by the fact that suitable plastic materials shrink significantly as they solidify and cool. Consequently if the plastic is moulded about a steel blade, the plastic material becomes highly stressed as it loses heat because it is locked to the steel blade and cannot shrink freely. These resulting residual stresses in the plastic material often contribute to premature failure of the ice skate, and consequently the combination of a body of synthetic plastic material moulded about a steel blade in the manner shown in the aforementioned patents has not been an acceptable alternative for more conventional forms of ice skates.

The present invention has been made after many efforts by applicant to utilize a blade-supporting body of synthetic plastic material is a commercially feasible composite type skate. The original efforts resulted in a composite type skate having greatly improved performance characteristics. More specifically, the skates were light and more responsive to the skater's demands. However, as with skates made according to prior art teachings, a serious problem developed with respect to fracturing or cracking of the plastic body. Such cracking either began immediately after manufacture or developed within a reasonably short period of use. After considerable experiment it was discovered that while commercially available materials such as those of the polycarbonate group had more than enough inherent structural strength, the manner in which the hardened steel blade was joined to the body was critically important. In earlier designs, like those of the prior patented art, when the body is initially moulded and mechanically interlocked with the skate blade, severe localized stresses are set up in the plastic material. It was further found that from these highly stressed areas cracks emanated which eventually caused the body to fail or sufficiently disrupted its appearance as to cause the user to lose confidence in its safety.

Thus, the present invention is directed to a composite skate design utilizing a blade-supporting body of synthetic plastic material joined to the skate blade in such a way as to eliminate such critical stress areas within the body thereby preventing cracking or fracturing of the body.

Hockey players who have tested skates made in accordance with the subject invention under playing conditions claim they sense more "life" or responsiveness in the blades. It is assumed that this reaction may be attributable to the greater flexibility of the assembly as compared to its all-steel counterpart.

A further advantage of the present invention is that through the use of a tough synthetic plastic material such as a polycarbonate, the blade-supporting body is not susceptible to denting, warping, chipping or rusting, all of which are common with a steel body.

Accordingly, the invention provides ice skates and methods of making ice skates which have a body of a synthetic plastic material and a steel blade. The body includes an upper portion for attachment to the sole of a suitable boot and the blade has an upper portion enclosed in the body and a lower portion projecting from the body. The blade has a non-interfering upper surface which allows the body to move freely longitudinally of the blade during shrinking. This movement prevents build-up of residual stress in the body.

The invention will be better understood with reference to the following description and associated drawings, in which:

FIG. 1 is a side elevation of a preferred embodiment of an ice skate assembly having a blade and a body according to the invention;

FIG. 2 is a side elevation of the blade before the body is moulded about an upper portion of the blade;

FIG. 3 is a cross-sectional end view on line 3—3 of FIG. 2;

FIGS. 4 to 7 are cross-sectional end views generally on line 4—4 of FIG. 1 to a reduced scale and showing various stages in completing the assembly by entering fastener means through the completed body and blade assembly;

FIG. 8 shows a moulding die used in a second method for forming the ice skate assembly also to a reduced scale;

FIG. 9 is a composite side view of a portion of an ice skate blade and illustrating three possible embodiments of blade for incorporation into further embodiments and in further methods of manufacture;

FIGS. 10 and 11 are side views to a smaller scale of two more ice skate blades suitable for use in the invention;

FIG. 12 illustrates a form of ice skate blade which is not acceptable in the present invention and which is illustrated for comparison purposes only; and FIG. 13 is a cross-sectional view of an embodiment of an ice skate assembly showing an alternative type of fastening means.

Reference is made to FIG. 1 which illustrates an ice skate assembly indicated generally at 20 and includes a steel blade 22 suitably mounted in a monolithic body 24 of a moulded synthetic plastic material. Body 24 includes a longitudinally extending blade-supporting section 26, a hollow first pedestal 28 having a heel plate 30 formed at the upper end thereof, a hollow second pedestal 32 and a forward strut 34 having a toe plate 36 integrally joined with pedestal 32 and strut 34.

Blade 22 is preferably blanked to the configuration of FIG. 2 from a 1065-1075 carbon steel of approximately 0.125 inch thickness. In this shape, the blade 22 includes a lower edge or surface having a generally centrally disposed, ice-engaging portion 38 and upwardly inclined front and rear portions 40 and 42. Blade 22 also includes an upper surface 44 which is straight and continuous throughout its length to facilitate shrinkage of body 24 relative to blade 22 as will be described. Rivets 45 extend through the blade and body to retain the blade in position in use and to rigidify the structure.

It has been found that moulding synthetic plastic material about a sharp metallic edge creates stress concentrations which can result in cracking and premature fracturing of the plastic where it contacts such an edge. Accordingly, it is preferred to radius or transversely round the upper blade surface 44 as better seen in FIG. 3.

In manufacture of the ice skate assembly 20, the blade 22 is first contoured, the holes 46 are formed for eventually receiving rivets 45 and the surface 44 is radiused. Any burrs or raised edges are ground off to give flat side surfaces and a regular smooth surface 44. The blade is then heat treated to a Rockwell Scale hardness of about 58 on the C scale.

As already indicated, previous attempts to form a moulded body of synthetic plastic material about a blade involved moulding the material so that it would flow through blade holes or other discontinuities and thereby interengage with the blade during the moulding operation. There would be a significant shrinkage as the body solidifies and then cools but for the fact that the plastic material is interengaged with the blade. As a result of this interengagement, severe stresses can be set up in the body resulting in cracking and premature failure in use.

The present invention avoids creating moulding stresses of a magnitude which will cause cracking or fracturing to occur in the plastic blade-supporting body by providing a method of manufacture in which the body is moulded directly onto the blade without any interengagement and then locked to the blade after the body has hardened and cooled.

Returning to the present method, after the blade has been made the holes 46 are filled with a relatively soft material to form plugs 48 which will not melt at the moulding temperature of about 500° F. Aluminum is a satisfactory material for this purpose. After thus filling holes 46, blade 22 is placed in a suitable split die and the body 24 is moulded about an upper portion of the blade so as to enclose upper surface 44 and the plugged holes 46. After initial hardening, the body 24 together with blade 22 is removed from the die and allowed to cool. There are no open holes, slots or projections which would interlock with the plastic during moulding, and consequently the plastic body is free to move relative to the blade as the body loses heat thereby avoiding the build-up of residual stresses in the body. In general the upper side portions of the blade in the body and the upper surface 44 are "non-interfering" with the plastic. The term "non-interfering" will be discussed more fully later.

FIG. 4 illustrates a plug 48 embedded in the body 24. After cooling, the body 24 is drilled transversely to remove the plugs 48 and to form axially aligned holes 50 in body 24 as seen in FIG. 5. The body holes are counterbored at 52 to receive the heads of the rivets 45 which extend through the body and blade holes to permanently attach the blade to the body as seen in FIG. 6. If desired, the recessed rivet heads may be enclosed by filling the counterbored portions 52 of body holes 50 with filler 54 of a synthetic plastic material as shown in FIG. 7.

The use of plugs 48 is but one method in a general method of manufacturing ice skate assemblies according to the invention. In general, provided that any openings formed in the blade are first blocked before moulding the body, the blade and body will not be interengaged where the rivets (or other fasteners) are to be used. This blocking can be done in many ways, a further one of which will now be described.

As seen in FIG. 8, die halves 56, 58 are provided having respective pin and plug elements 60 and 62 adapted to enter blade holes 63 and to block the flow of moulding material during the moulding operation. After moulding and initial hardening, the halves 56, 58 are opened (as seen in FIG. 8) and the blade and body removed from pin 60 and plug 62 leaving holes 64 in the body aligned with holes 63 in the blade. Counterbores or recesses 66 are also formed. As before, suitable fastening means are inserted through the aligned holes 63, 64.

The rear end of plastic body 24 is formed to be bulbous and to terminate in transverse alignment with the rear end of blade 22. This limits the possibility of injury to other players who come into contact with the end of the body. Further protection can be provided by forming a rearward extremity of the body about the rear end of the blade to prevent the blade end from damaging other skates or players. However in the latter design the body must shrink towards the rear end of the body because it is in engagement with the blade. It may be preferable in some instances not to use this structure so that shrinkage can take place with no designed limitation.

It is apparent that a strong, tough and resilient synthetic plastic material should be used to form body 24. While other thermoplastic materials may be satisfactory, plastics of the polycarbonate group and designated by their manufacturers as LEXAN (General Electric) and CYCOLOY (Borg-Warner) have proved highly satisfactory in this application.

In both of the methods of manufacture described thus far the openings in the blade are blocked either by the use of soft metal plugs or by including devices in the mould halves to prevent the flow of moulding material into the openings. In the former method it will be appreciated that the plugs must be removed and that it is therefore essential to use devices to locate the moulded body and blade so that when the plug is drilled, the location of the plug is known. The method described with reference to FIG. 8 obviates this difficulty but introduces a further difficulty. If pins 60 are to be used in each of the holes 63, close tolerancing will be necessary to ensure that the pins fit in the holes. A variation of this method would be to use pins in two of the holes and to either use plugs in the remainder of the holes or to provide portions of the die which will occlude the holes. These portions will be slightly larger than the holes so that the holes 64 (FIG. 8) would be slightly larger than the holes 63 with which they are associated. However, this would not effect the performance of the rivets if the counterbores 66 and the heads of the rivets are sufficiently large. It should also be noted that in any of the methods described with reference to FIG. 8, once the body has shrunk, the openings 64 may not remain in alignment with openings 63 with which they are associated. Consequently, it is preferable in many instances to make the openings 64 larger than the openings 63 to accommodate movement without any subsequent re-working of the body to facilitate entry of the rivets through the openings 64 and openings 63.

FIG. 9 illustrates several variations of blade which can be used with the invention. Each of these variations has the advantage that from the standpoint of accuracy the tolerances between openings in the blade are of less importance than with the prior methods.

Reference is now made to FIG. 9 which is a compound view of the blade incorporating three embodiments. Firstly, in place of the hole 46 (FIG. 2) which has a diameter corresponding to the outside diameter of the rivet 45 (FIG. 1) an opening 68 is used and blocked using a plug 70 of aluminum or the like. Because of the size of this plug, it will be apparent that a hole for the rivet could be drilled through this plug with quite coarse tolerances once the blade has been received in the moulded body. Similarly, the opening could have any desirable shape such as the generally rectangular opening 72 which is blocked by a corresponding plug 74.

FIG. 9 also illustrates a third possibility in that the blade could be hardened along its outer zone 76 (indicated by ghost outline) so that a softer portion of the blade is available for drilling wherever the rivet is to go. In general, FIG. 9 illustrates a blade having at least one softer area for drilling to receive rivets (or any other fastener). It will be evident that the method described with reference to FIGS. 4 to 7 can be used and that the drill can be passed through the blade without such accurate location as would be necessary in the previously described method.

At this point, the general use of the term "blocking" will be discussed further. In the preferred embodiment the holes to receive the rivets were blocked either by the use of plugs or by pins in the mould. Similarly, in other embodiments openings such as the openings 68, 72 (FIG. 9) were blocked using plugs 70, 74. Although not all of the material of these plugs needs to be removed to receive the rivets, the term "blocking" when applied to an opening in a blade includes such embodiments.

In the case of the blade having two hardness portions, the holes could be place anywhere in the softer portion provided that the body was first moulded without recesses to receive the rivets. If recesses are provided in the mould, then they would be used to locate the drill for drilling through the softer part of the blade.

Other methods of manufacture are also possible where the accuracy of location of the blade in the body is not as important as in the preferred embodiment. For instance, only one of the rivet openings would be located by a pin in the mould and the other openings blocked either by plugs or simply by suitable parts of the mould. Of course the counterbores or recesses (52, FIG. 5) must be sufficiently large to accommodate rivets after uncontrolled shrinkage.

It will be evident from the description thus far that the body must be free to move longitudinally on the blade to avoid shrinkage stresses. Consequently, the blade must be sufficiently well finished and have a form to permit this movement. Although the blade shown in FIG. 1 is to be preferred, there are other possible shapes which will be within the scope of the invention and which may be desirable in certain circumstances. The term "non-interfering upper surface" will be used to describe the upper surfaces of blades which are satisfactory. Apart from the straight upper surface shown in FIG. 1, surfaces such as those shown in FIGS. 10 and 11 are satisfactory. In FIG. 10, the upper surface includes a long depression 80 defined by forward and rearward portions which extend upwardly at the extremities of the depression. As indicated in ghost outline, the rearward upward portion (or for that matter, the forward upper portion) could be omitted. Shrinkage would take place freely in any of these forms provided that the moulded body is not formed around forward or rearward extremities of the blade.

A further suitable blade is shown in FIG. 11 which illustrates a blade having a concave upper surface 82 which again would not interfere with longitudinal shrinkage of the body.

In general, the upper surface of the blade will be non-interfering within the definition of the term used in this application if the plastic body is free to shrink longitudinally relative to the blade. In order to further demonstrate this concept, FIG. 12 is included to illustrate a structure which would not be acceptable. Upward projections 84 would limit free longitudinal shrinkage of the body and therefore create residual stresses in the body.

As previously illustrated with reference to the embodiment shown in FIG. 1, the upper surface of all of the blades is preferably rounded transversely to limit the possibility of interference between the body and the blade and also to limit local stress concentrations in the body. Further, the side surfaces of an upper portion of the blade inside the groove in the body containing the blade will also be "non-interfering" to permit the shrinkage movement.

Yet another method of manufacture would be to use a soft blade which is embedded in the body according to any of the foregoing methods and then to harden the bottom of the blade using a localised hardening technique such as induction hardening.

Throughout the foregoing description, rivets have been used to attach the blade to the body. It will be appreciated that although such a fastener is preferred, any other suitable mechanical fastener can also be used. An example of such a fastener is shown in FIG. 13.

Heretofore when a skate blade wears out due to repeated sharpening or breaks, it has been necessary to remove and replace the entire ice skate assembly. The embodiment shown in FIG. 13 makes it feasible for the blade alone to be removed and replaced. Instead of utilizing rivets for interlocking blade 22 to body 24, a removable and internally threaded stud and screw, indicated generally at 86 may be substituted. Since the blade 22 is not otherwise interlocked to body 24, studs and screws may be easily separated allowing the old blade to be removed and a new one substituted.

A further significant aspect in the construction of plastic body 24 is the cross-section of the elongated section of member 26 (FIG. 1). This cross-section is the same as that shown in FIG. 13. It has been found that if the cross-section of member 26 is generally round as found in normal metal skate body construction, the longitudinal flexure thereof can be as much as four to five times as great as compared to the disclosed essentially diamond shaped cross-section. By way of illustration, by restraining the ends of body member 26 and applying a transverse force of 25 lbs. midway of member 26 an ovalized cross-section will deflect about 0.050 inch, a rounded cross-section about 0.040 inch, and the diamond shaped cross-section will deflect only about 0.010 inch.

The box-like or diamond shaped cross-section of the upper portion of member 26 is defined by substantially planar surfaces 88, 90 which converge upwardly at about 90 degrees to one another. Further surfaces 92, 94 extend from surfaces 88, 90 and converge downwardly at about 90° to one another terminating at parallel side faces 96, 98 at a lower part of the body.

What I claim is:

1. A method of forming an ice skate assembly of the type including an elongated steel blade having an upper portion, a lower portion including a skating edge, and ends, and a blade-supporting body of a synthetic plastic material and comprising the steps:

forming a plurality of transverse holes in longitudinal alignment along the length of said blade;
   heat treating to harden said blade;
   temporarily plugging the transverse holes in said blade;
   moulding a blade-supporting body of synthetic plastic material about said upper portion of the blade including said holes such that at least one of said ends of the blade is not covered by the blade-supporting body;
   allowing said body and blade to cool after moulding whereby said plastic body may shrink relative to said blade;
   unplugging the blade holes so as to provide transverse passages through said body and said blade; and
   inserting means in said transverse passages to mechanically interlock said blade and said body.

2. A method of forming a skate assembly of the type including an elongated steel blade having an upper portion, a lower portion including a skating edge, and ends, and a blade-supporting body of synthetic plastic material comprising the steps:

forming a plurality of transverse holes in longitudinal alignment along the length of said blade;
   heat treating to harden said blade;
   filling said blade holes with a material softer than said hardened steel blade;
   moulding a blade-supporting body of synthetic plastic material about said upper portion of the blade including said filled holes such that the lower portion and at least one of said ends of the blade are not covered by the blade-supporting body;
   allowing said moulded plastic body and said blade to cool whereby said body may shrink without interference by said blade;
   removing said material from said blade holes so as to provide transversely open passages through said body and said blade; and
   inserting means in said transverse passages to mechanically interlock said blade and said body.

3. A method of manufacturing an ice skate of the type which is to be attached to the sole of a suitable boot, the method comprising the steps:

forming an elongated steel blade having an upper portion including a non-interfering upper surface and non-interfering side surfaces, a lower portion including a lower ice engaging surface terminating in upwardly curved front and rear end portions, and ends;
   moulding a blade-supporting body of synthetic plastic material about the upper portion while leaving the lower portion unenclosed and such that the blade-supporting body is in contact with said upper surface and said side surfaces and such that at least one of said ends of the blade is not covered by the blade-supporting body;
   allowing the moulded body to cool whereby the body may shrink longitudinally of the blade without interference with the blade; and
   inserting fastener means through the assembly of the body and the blade at said upper portion to mechanically lock the blade and the body to one another.

4. A method of manufacturing an ice skate as claimed in claim 3 in which the blade is further formed to have at least one part of softer material in the upper portion of the blade and to have a harder portion at least including the ice engaging surface, and in which the fastener means is inserted through said softer material.

5. A method of manufacturing an ice skate as claimed in claim 3 in which the blade is further formed to define a plurality of transverse holes in the upper portion, the holes being spaced longitudinally along the length of the blade, and in which the method further includes the step of temporarily blocking the transverse holes in the blade prior to moulding the body so that the fastener means is subsequently inserted through the blade at these holes after moulding and shrinking of the body.

6. A method of manufacturing an ice skate as claimed in claim 3 in which the blade is further formed to define a plurality of transverse holes in the upper portion, the holes being spaced longitudinally of the length of the blade, and in which the method further comprises the step of blocking these holes by placing a softer material which can withstand moulding temperatures in the holes so that after moulding and shrinking the fastener means are inserted at these holes.

7. A method of manufacturing an ice skate as claimed in claim 5 in which the method further includes the step of inserting a locating pin in one of the holes before blocking the other holes.

8. A method of manufacturing ice skates as claimed in claim 3 in which the skate body is moulded to define recesses and coaxial holes in the body at the locations where the fastener means are to be engaged, the recesses being adapted to receive the heads and ends of the fastener means and the holes being adapted to receive the respective bodies of the fastener means.

9. A method of manufacturing an ice skate as claimed in claim 3 and in which the blade is further formed to round the longitudinal edges of the non-interfering upper surface to blend the upper surface into the side surfaces of the blade.

10. A method of manufacturing an ice skate as claimed in claim 1 and in which the blade is further formed to round the longitudinal edges of the upper surface to blend the upper surface into the side surfaces of the blade.

11. A method of manufacturing an ice skate as claimed in claim 6 in which the method further includes the step of inserting a locating pin in one of the holes before blocking the other holes.

12. A method of manufacturing an ice skate as claimed in claim 5 in which the method further includes the steps of inserting respective locating pins in at least two of the holes before blocking the remaining ones of the holes, and of removing the pins after the moulding step and before any significant body shrinkage has taken place.

13. A method of manufacturing an ice skate as claimed in claim 12 in which said remaining ones of the holes are blocked by covering ends of these holes before moulding the body.

* * * * *